(12) United States Patent
Asar et al.

(10) Patent No.: US 11,640,389 B2
(45) Date of Patent: May 2, 2023

(54) HASH-BASED IDENTIFICATION OF DATA CORRUPTION ISSUES IN TIME-SERIES DATA

(71) Applicant: Bank of America Corporation, Charlotte, NC (US)

(72) Inventors: Siddharth Asar, Mumbai (IN); Prabakar Rangarajan, Republic of Singapore (SG); Viraj Mohan Kamat, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 6 days.

(21) Appl. No.: 17/384,201

(22) Filed: Jul. 23, 2021

(65) Prior Publication Data

US 2023/0025284 A1  Jan. 26, 2023

(51) Int. Cl.
*G06F 16/00* (2019.01)
*G06F 16/23* (2019.01)
*G06F 16/22* (2019.01)

(52) U.S. Cl.
CPC ...... *G06F 16/2365* (2019.01); *G06F 16/2255* (2019.01)

(58) Field of Classification Search
CPC ............... G06F 3/0482; G06F 3/04845; G06F 11/2023; G06F 11/2033; G06F 15/76; G06F 16/24578; G06F 16/254; G06F 16/285; G06F 16/444; G06F 16/9024; G06F 2201/805; G06F 2201/82; G06F 2201/85; G06F 3/0484; G06F 3/04842; G06F 3/04847; G06F 40/134; G06F 8/65; G06F 16/14; G06F 16/174; G06F 16/1748; G06F 16/184; G06F 16/9027; G06F 21/57; G06F 3/0485; G06F 3/04883; G06F 3/04886; G06F 40/205; G06F 40/211; G06F 40/242; G06F 40/253; G06F 40/30; G06F 40/40; G06F 9/30

See application file for complete search history.

(56) References Cited

U.S. PATENT DOCUMENTS 8,655,887 B2   2/2014   Liu et al.
8,903,593 B1   12/2014  Addepalli et al.
(Continued)

OTHER PUBLICATIONS

Siddharth Asar et al; System and Method for Efficiently Validating Time-Series Data Using a Hash-Based Representation of the Data; U.S. Appl. No. 17/384,294, filed Jul. 23, 2021.

*Primary Examiner* — Shyue Jiunn Hwa

(57) ABSTRACT

An apparatus includes a memory and a processor. The memory stores a time-series of data sets, and a first version of a data structure generated from the time-series as it existed at a first time. The data structure includes a bottom level of nodes, and subsequent levels of nodes, ending with a top level terminal node. Each bottom level node stores a hash of an assigned time-series data set. Each node of each subsequent level stores data generated from an assigned group of nodes of a previous level. The processor receives a validation request. In response, the processor generates a second version of the data structure based on the time-series as it exists at a second time. The processor determines that the terminal nodes in the first and second versions of the data structure do not match. In response, the processor generates an alert.

20 Claims, 6 Drawing Sheets

(56) References Cited

U.S. PATENT DOCUMENTS

| | | |
|---|---|---|
| 8,972,467 B2 | 3/2015 | Heinrich et al. |
| 8,989,376 B2 | 3/2015 | Ren et al. |
| 9,063,979 B2 | 6/2015 | Chiu et al. |
| 9,384,207 B2 | 7/2016 | Provenzano et al. |
| 9,530,010 B2 | 12/2016 | Mashima et al. |
| 9,680,767 B2 | 6/2017 | Karthikeyan et al. |
| 10,148,540 B2 | 12/2018 | Boubez |
| 10,176,246 B2 | 1/2019 | Dang et al. |
| 10,389,745 B2 | 8/2019 | Mueen et al. |
| 10,445,698 B2 | 10/2019 | Hunn |
| 10,509,785 B2 | 12/2019 | Arye et al. |
| 10,549,898 B2 | 2/2020 | Park et al. |
| 10,560,468 B2 | 2/2020 | Muddu et al. |
| 10,621,203 B2 | 4/2020 | Hunt et al. |
| 10,810,210 B2 | 10/2020 | Choudhury et al. |
| 10,977,233 B2 | 4/2021 | Swan et al. |
| 2015/0242747 A1 | 8/2015 | Packes et al. |
| 2015/0254330 A1 | 9/2015 | Chan et al. |
| 2016/0162372 A1 | 6/2016 | Whitehead et al. |
| 2016/0317077 A1 | 11/2016 | Sillay |
| 2016/0328432 A1 | 11/2016 | Raghunathan |
| 2017/0091754 A1 | 3/2017 | Silbernagl |
| 2017/0148264 A1 | 5/2017 | Pichette et al. |
| 2017/0173262 A1 | 6/2017 | Veltz |
| 2017/0249649 A1 | 8/2017 | Garvey et al. |
| 2018/0025365 A1 | 1/2018 | Wilkinson et al. |
| 2018/0039399 A1 | 2/2018 | Kaltegaertner et al. |
| 2018/0046926 A1 | 2/2018 | Achin et al. |
| 2018/0075536 A1 | 3/2018 | Jayaram et al. |
| 2018/0089188 A1 | 3/2018 | Kharisma et al. |
| 2018/0247191 A1 | 8/2018 | Katz et al. |
| 2018/0268142 A1 | 9/2018 | Sethumadhavan et al. |
| 2018/0300484 A1 | 10/2018 | Sethumadhavan et al. |
| 2019/0220583 A1 | 7/2019 | Douglas et al. |
| 2019/0247650 A1 | 8/2019 | Tran |
| 2019/0319868 A1 | 10/2019 | Svennebring et al. |
| 2019/0377889 A1* | 12/2019 | Mertens .................. G06F 21/60 |
| 2020/0134489 A1 | 4/2020 | Achin et al. |
| 2020/0349115 A1* | 11/2020 | Gupta .................... G06F 16/14 |
| 2021/0073994 A1 | 3/2021 | Gurevich et al. |
| 2021/0132582 A1 | 5/2021 | Biernat et al. |

* cited by examiner

HASH-BASED IDENTIFICATION OF DATA CORRUPTION ISSUES IN TIME-SERIES DATA

TECHNICAL FIELD

This disclosure relates to data storage systems, and more particularly, to hash-based identification of data corruption issues in time-series data.

BACKGROUND

Organizations often store large quantities of data in databases or other data storage systems. Even if data is of a high quality and free of errors when initially stored in the data storage system, errors in the data may later arise. Such errors may be the result of memory/storage corruption issues, human error, malware infections, or any other adverse situation affecting the data storage system and/or the data stored within the system. Accordingly, prior to using data that has been stored in a data storage system, it is often desirable to validate the data, in order to identify and remediate any errors that may have been introduced since the data was first stored in the system. One possible method for validating stored data is to maintain multiple copies of the stored data, and to compare the copies element-by-element with one another to identify any inconsistencies. While this method may be suitable for use in validating small quantities of stored data, it quickly becomes impractical as the amount of data increases, due to the associated increases in memory and processing resources consumed while performing the comparisons.

SUMMARY

The system described in the present disclosure may particularly be integrated into a practical application of a validation tool for an organization that routinely transmits time-series data to external systems. Whenever new time-series data is generated by the organization, the validation tool creates a compressed representation of the time-series data, and stores the compressed representation as a golden copy data structure, which acts as a record of the initial (and presumably valid) state of the time-series. Later, when the organization attempts to transmit the time-series to an external system, the validation tool creates a new version of the compressed representation of the time-series, based on the time-series as it currently exists within the system, and compares this new version to the golden copy. If the new version and the golden copy match, the validation tool determines that the entries of the time-series are unchanged and therefore are presumably valid, and transmits the time-series as requested. If, however, the new version and the golden copy do not match, the validation tool next identifies those data set(s) within the time-series that have changed since the time-series was first created, and transmits a request to a device responsible for generating the data set and/or applying updates to the data set, requesting confirmation of that the identified changes are intended changes (e.g., backdated changes posted after the time-series was initially stored in the system), or unintended changes (e.g., data corruption errors, or errors inadvertently introduced into the data). If the response from the device indicates that the changes are intentional changes, the tool updates the golden copy data structure to reflect the changes, and transmits the time-series as requested. If the response from the device indicates that the changes are unintended changes, the tool declines to transmit the time-series until the erroneous changes have been remediated.

Because the system stores a compressed representation of the time-series for use in validating the time-series, the system conserves significant amounts of storage resources as compared with a conventional system that stores a back-up copy of the time-series and relies on an element-by-element comparison between the time-series and the back-up copy to validate the time-series. In particular, because the compressed representation of the time-series represents each data set of the time-series (which may include thousands or millions of individual data elements) with a single hash value, in certain embodiments, the compressed representation of the data structure consumes orders or magnitude less storage space than would a back-up copy of the time-series. Similarly, because the compressed representation of the time-series includes a terminal node that stores a single hash value that depends on all of the data sets within the time-series, the system is able to determine whether two versions of a time-series are identical, based on a single comparison of the values stored by the terminal nodes of the compressed representations of the two versions of the time-series. Accordingly, certain embodiments of the system conserve considerable amounts of processing resources as compared with a conventional system that stores a back-up copy of the time-series, and may need to perform millions of element-by-element comparisons in order to determine that two versions of a time-series match.

Certain embodiments of the system may additionally conserve significant amounts of networking resources. In particular, by validating the time-series prior to transmitting the time-series to an external system, certain embodiments conserve the networking resources that would otherwise be expended by first transmitting an unvalidated time-series which includes one or more errors to the external system, and then re-transmitting a corrected version of the time-series once those errors are identified.

According to an embodiment, an apparatus includes a memory and a hardware processor communicatively coupled to the memory. The memory stores a time-series including a plurality of data sets, and a first version of a data structure generated based on the time-series as it existed in the memory at a first time. The data structure includes a sequence of levels. The sequence of levels includes a bottom level, and a plurality of subsequent levels. The plurality of subsequent levels includes a top level. Each level of the sequence of levels includes one or more groups of nodes, and each group of nodes of the level includes one or more nodes. Each node of the one or more nodes stores data. Each data set of the time-series is assigned to a node of the bottom level. The data stored by the assigned node includes a compressed representation of the data set. Each subsequent level of the plurality of subsequent levels is assigned to a previous level of the sequence of levels. Each node of the subsequent level is assigned to a group of nodes of the assigned previous level and stores data that was generated using the assigned group of nodes of the assigned previous level. The top level includes a terminal node. The hardware processor receives a first request to validate the time-series. In response to receiving the first request, the hardware processor generates a second version of the data structure based on the time-series as it exists in the memory at a second time later than the first time. The hardware processor also determines that the data stored by the terminal node in the first version of the data structure does not match the data stored by the terminal node in the second version of the data structure. In response to determining that the data stored by the terminal node in the first version of the data structure does not match the data stored by the terminal node in the second version of the data structure, the hardware processor generates an alert indicating that the time-series has changed between the first time and the second time.

According to another embodiment, an apparatus includes a memory and a hardware processor communicatively coupled to the memory. The memory stores a time-series of a plurality of data sets, and a first version of a data structure generated based on the time-series as it existed in the memory at a first time. Each data set of the plurality of data sets of the time-series was generated by a department of one or more departments within an enterprise. The data structure includes a top level and a bottom level. The top level includes a terminal node configured to store a compressed representation of the time-series. The bottom level includes one or more nodes. Each data set of the time-series is assigned to a node of the bottom level. The assigned node is configured to store data including a compressed representation of the data set, and an identification of the department associated with the data set. The hardware processor receives a first request to transmit the time-series to an external system. In response to receiving the first request, the hardware processor generates a second version of the data structure based on the time-series as it exists in the memory at a second time later than the first time. The hardware processor also determines that the data stored by the terminal node in the first version of the data structure does not match the data stored by the terminal node in the second version of the data structure. In response to determining that the data stored by the terminal node in the first version of the data structure does not match the data stored by the terminal node in the second version of the data structure, the hardware processor identifies a node of the bottom level of the data structure for which the data stored by the identified node of the bottom level in the second version of the data structure does not match the data stored by the identified node of the bottom level in the first version of the data structure. In response to identifying the node of the bottom level of the data structure, the hardware processor transmits a request to a device belonging to the department associated with the data set assigned to the identified node. The message requests validation of the data set assigned to the identified node. In response to receiving the request, the device of the department is configured to validate the data set. The hardware processor also receives a response. The response indicates that a change made to the data set assigned to the identified node between the first time and the second time was either intentional or unintentional.

Certain embodiments provide one or more technical advantages. As an example, an embodiment generates a compressed representation of a time-series, in the form of a hash-based data structure, and stores the compressed representation for later use in validating the time-series. Validation of the time-series may be desirable for any of a number of reasons including to help ensure the accuracy of any subsequent calculations and/or decisions made based on the time-series, as well as to help ensure the validity of any other uses to which the time-series may be put. In particular, failure to validate a time-series prior to its subsequent use may lead to a considerable waste of processing resources, as any calculations performed using an invalid time-series will likely need to be repeated once the associated errors have been identified and remediated. Similarly, failure to validate a time-series prior to transmitting the time-series to an external system may lead to a considerable waste of net-working resources, as such transmission may also need to be repeated once errors within the time-series have been identified and remediated.

In certain embodiments, using the compressed representation to validate the time-series conserves storage and processing resources as compared with existing data validation systems that store multiple copies of a time-series and validate the time-series through an element-by-element comparison of the copies. In particular, a given time-series may include a large number of data sets, each of which may include thousands or even millions of individual data elements. Because the compressed representation of the time-series uses a single hash value to represent each data set of the time-series, storage of the compressed representation consumes considerably less disk space than storage of a duplicate copy of the time-series. Similarly, because the compressed representation of the time-series includes a single terminal node hash value that provides a representation of the entire time-series, multiple versions of a given time-series can be compared simply by comparing the values stored by the terminal nodes of the compressed representations of those time-series. In particular, a single comparison between the value stored by the terminal nodes of a compressed representation of a first version of a time-series and a compressed representation of a second version of a time-series indicates whether or not the first and second versions of the time-series match. This conserves considerable processing resources as compared to an alternative element-by-element comparison of each of the (potentially millions) of data elements of the two versions of the time-series.

As another example, an embodiment stores the compressed representation of the time-series in multiple locations (including at least one location physically separate from the location in which the time-series itself is stored), thereby helping to ensure that the time-series and the compressed representation of the time-series are not both impacted by any given memory/storage corruption issue that may occur. For instance, if both the time-series and the compressed representation of the time-series were stored in the same storage location, a corruption event (e.g., a malware infection) could damage both the time-series and the compressed representation of the time-series. In such a situation, the compressed representation of the time-series would likely be rendered useless in fulfilling its purpose of enabling a computationally efficient identification of the data sets within the time-series that have been impacted by the corruption event, potentially necessitating a computationally intensive process of evaluating each individual element of the time-series in an attempt to identify any errors. By storing the compressed representation of the time-series in a physically separate location from the time-series (e.g., a separate database, a hard drive that is disconnected from the network, etc.), certain embodiments help to ensure that the compressed representation of the time-series is not affected by the same corruption event as the time-series, thereby enabling its use in identifying the data sets of the time-series that have been impacted by the corruption event, in a computationally efficient manner.

As another example, an embodiment applies locks to the data sets of a time-series and/or to the golden copy compressed representation of the time-series to help protect the time-series against inadvertent changes. In particular, after a new data set is added to the time-series, certain embodiments automatically lock the data set, preventing users of the system from changing any of its values. In this manner, the introduction of errors into the data sets of the time-series may be limited to memory/storage corruption events. Because processing resources are expended in remediating errors introduced into a time-series, by limiting the avenues by which errors may be introduced into the time-series, certain embodiments conserve processing resources.

As another example, an embodiment automatically validates the contents of a time-series, prior to transmitting the time-series to an external system. By validating the time-series prior to transmission, certain embodiments conserve networking resources that would otherwise be expended by first transmitting an unvalidated time-series that includes one or more errors to the external system, and then subsequently retransmitting a corrected version of that time-series, once the errors have been identified and remediated. Furthermore, validating the time-series prior to transmission to an external system helps to conserve the processing resources of the external system that would otherwise be consumed in performing operations on the received (and invalid) time-series, which likely would later need to be repeated once the validated time-series had been received.

As a further example, certain embodiments that transmit the time-series to an external system also transmit the compressed representation of the time-series to the external system, thereby enabling the external system to confirm that the time-series data was not corrupted during the transmission process. In this manner, networking resources may be conserved. For example, a system administrator of an external system may suspect that a time-series transmitted to the external system was corrupted during the transmission process, for any of a number of reasons (e.g., the transmission was paused and/or restarted, the external system lost power around the time the transmission was to be completed, etc.). Without the ability to confirm that the time-series was received without errors, the administrator may request retransmission of the time-series, thereby expending additional networking resources. This additional expenditure of networking resources may be avoided if the validity of the received time-series is confirmed using the compressed representation.

Certain embodiments may include none, some, or all of the above technical advantages. One or more other technical advantages may be readily apparent to one skilled in the art form the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages may be understood by referring to FIGS. 1 through 4 of the drawings, like numerals being used for like and corresponding parts of the various drawings.

I. System Overview

Figure 1:
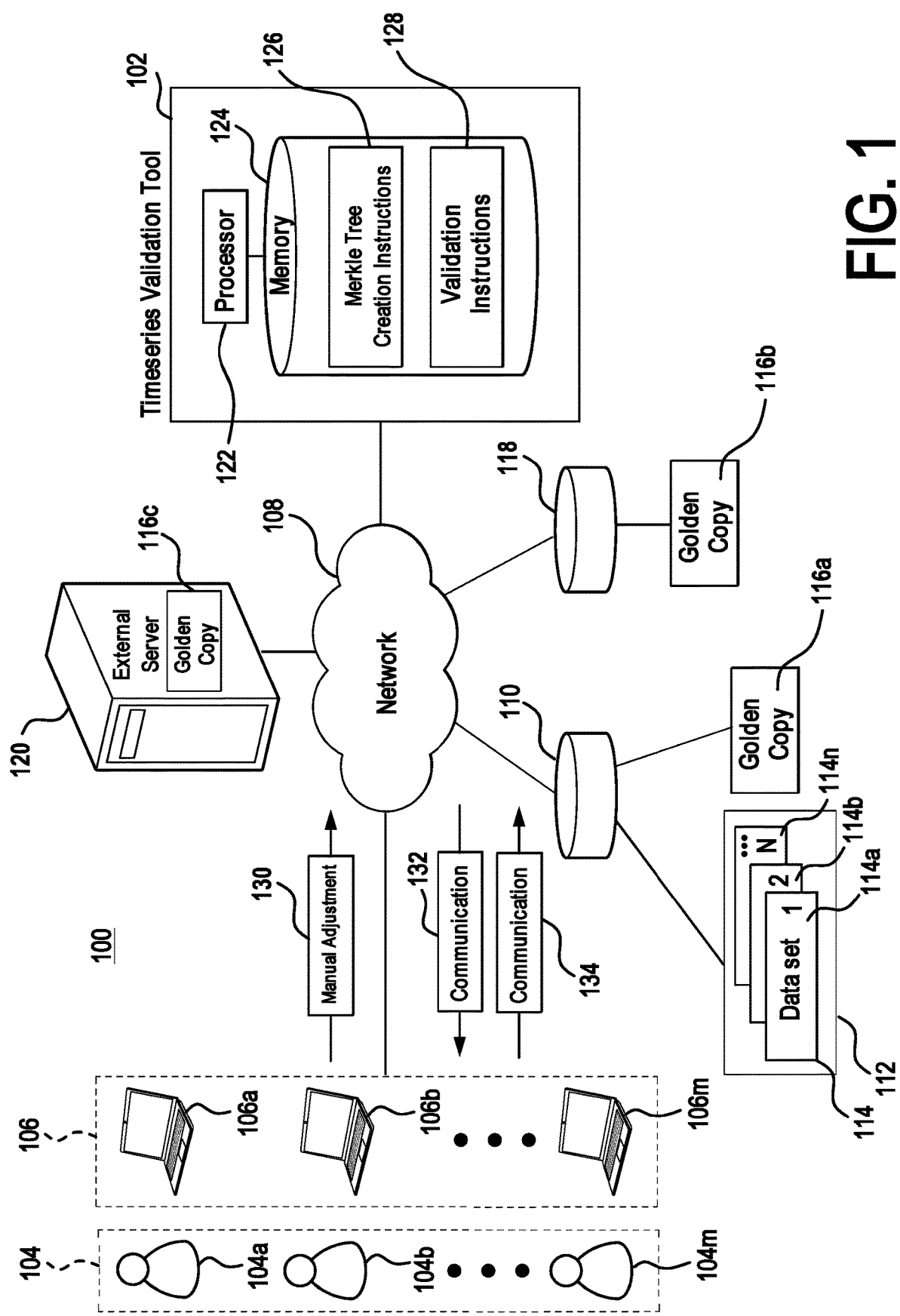
FIG. 1 illustrates an example time-series validation system.

FIG. 1 illustrates an example time-series validation system 100 that includes user(s) 104, device(s) 106, network 108, first database 110, second database 118, external server 120, and time-series validation tool 102. Generally, time-series validation tool 102 acts to validate a time-series 112, made up of multiple data sets 114, by efficiently identifying any data sets 114 that have changed since the last time the tool validated the time-series, or since the time-series was first registered with the tool. To do this, time-series validation tool 102 uses a compressed representation of the time-series, in the form of a time-series data structure, generated from time-series 112. The time-series data structure may be any suitable data structure that provides a compressed representation of the time-series. For example, in certain embodiments, the time-series data structure is a Merkle tree data structure. When a time-series 112 is first registered with time-series validation tool 102, the tool generates an initial version of the time-series data structure, and stores this data structure in one or more locations within system 100 (e.g., first database 110 and/or second database 118). This initial version of the time-series data structure is referred to as the "golden copy" data structure because it is the copy against which subsequent versions of the time-series data structure are to be validated. Specifically, the golden copy data structure 116 provides a compressed representation of time-series 112 as it existed in first database 110 at a given time when the validity of each data set 114 is presumed to have been known (e.g., when time-series 112 was first stored in database 110, immediately after time-series 112 passed a validation check, etc.). At a later time, when time-series validation tool 102 receives a request 134 to validate time-series 112, the tool computes a new version of the time-series data structure based on the time-series 112 as it exists in database 110 at that later time, and compares the new version of the time-series data structure to the golden copy data structure 116. For large time-series 112, generating the new version of the time-series data structure and comparing to the golden copy data structure 116 may conserve considerable computational resources as compared to storing multiple versions of the time-series 112 and comparing those versions element-by-element to identify any inconsistencies. As a specific example, FIG. 2A (which is discussed in further detail below) illustrates an example golden copy data structure 116 in the form of a Merkle tree, in which the terminal node 206 of the Merkle tree 116 stores a hash value that depends on the entire contents of time-series 112. When a Merkle tree data structure is used for the compressed representation of time-series 112, determining whether time-series 112 has changed since golden copy data structure 116 was first created simply involves comparing the terminal node 206 of the golden copy Merkle tree data structure 116 with the terminal node of a new version of the Merkle tree data structure, generated from the time-series 112 as it currently exists in database 110. If the terminal nodes match, this indicates that none of the information stored in time-series 112 has changed since golden copy data structure 116 was first created. Further details regarding golden copy data structure 116, including the manner by which time-series validation tool 102 generates golden copy data structure 116, and the manner by which time-series validation tool 102 uses golden copy data structure 116 to validate time-series 112, are presented below and in the discussion of FIGS. 2A through 4.

Devices 106 are used by users 104 located on network 108 to communicate with time-series validation tool 102. As an example, in certain embodiments, devices 106 are used by users 104 to submit validation requests 134 to time-series validation tool 102. As another example, in certain embodiments, devices 106 are used by users 104 to submit requests 134 to time-series validation tool 102, requesting that time-series validation tool 102 transmit time-series 112 to an external system 120. For example, time-series validation tool 102 may belong to an enterprise or organization that is subject to certain reporting requirements. In particular, the organization may be subject to a requirement to maintain certain records in the form of time-series 112, and to periodically transmit those records to an external agency, in order to demonstrate regulatory compliance. Accordingly, in certain such embodiments, devices 106 may be used to submit requests 134 to time-series validation tool 102, requesting that the tool transmit time-series 112 to an external server 120 belonging to the external agency. In some embodiments, time-series validation tool 102 may automatically validate and transmit time-series 112 to external server 120 periodically, or at any suitable intervals (e.g., time-series validation tool 102 may transmit time-series 112 to external server 120 without first receiving a request 134 to do so from a user 104).

Devices 106 are also used by users 104 to receive requests 132 from time-series validation tool 102. As an example, in certain embodiments, in response to a failed validation attempt, time-series validation tool 102 may transmit a request 132 to a user 104, requesting that the user manually validate all or a portion of time-series 112. For instance, in certain embodiments each data set 114*a* through 114*n* of time-series 112 is associated with a given department within an organization, to which one or more of users 104 belong. In such embodiments, in response to a failed validation attempt, time-series validation tool 102 is configured to first identify one or more data sets 114 of time-series 112 that have changed since time-series 112 was first used to generate golden copy 116, and then to transmit request(s) 132 to those user(s) 104 who are associated with the changed data sets (e.g., those user(s) 104 who belong to the department(s) associated with the changed data set(s) 114), requesting that the user(s) perform manual verification of the identified data set(s). For example, in response to determining that data set 114*a* has changed since time-series 112 was first used to generate golden copy 116, time-series validation tool 102 may (1) determine that data set 114*a* was generated by a first department within the organization, (2) determine that user 104*b* belongs to the first department, and (3) transmit a request 132 to the device 106*b* of user 104*b*, requesting that user 104*b* confirm whether or not the change to data set 114*a* was intentional.

In certain embodiments, devices 106 are also used by users 104 to modify time-series 112. For example, in some embodiments a user 104*a* may determine that a backdated adjustment should be made to time-series 112 (e.g., user 104*a* may identify an incorrect piece of information stored in time-series 112 that should be corrected). Accordingly, user 104*a* may use device 106*a* to modify one or more data sets 114 of time-series 112 to implement the backdated adjustment. As a specific example, user 104*a* may determine that a data set 114*c*, which corresponds to data that was submitted for the month of May 2020, includes an incorrect value. Accordingly, user 104*a* may use device 106*a* to post a manual backdated adjustment 130 to time-series 112, which corrects the incorrect value within data set 114*c*, as well as modifies any data sets 114 from subsequent months (e.g., June 2020 to present) that were impacted by the incorrect value.

Devices 106 include any appropriate device for communicating with components of system 100 over network 108. For example, devices 106 may include a telephone, a mobile phone, a computer, a laptop, a wireless or cellular telephone, a tablet, a server, an IoT device, and/or an automated assistant, among others. This disclosure contemplates devices 106 being any appropriate device for sending and receiving information over network 108. Device 106 may also include one or more user interfaces, such as a display, a keypad, a speaker, a microphone, or other appropriate terminal equipment usable by user 104. In some embodiments, an application executed by a processor of device 106 may perform the functions described herein.

Network 108 facilitates communications between components of system 100 including, for example, time-series validation tool 102, devices 106, databases 110 and 118, and external server 120. Network 108 may include any interconnecting systems capable of transmitting audio, video, signals, data, messages, or any combination of the preceding. For example, network 108 may include all or a portion of a public switched telephone network (PSTN), a public data network, a metropolitan area network (MAN), a wide area network (WAN), a local, regional, or global communication or computer network, such as the Internet, a wireline or wireless network, or any other suitable communication link, including combinations thereof, operable to facilitate communication between time-series validation tool 102, devices 106, databases 110 and 118, and/or external server 120. While illustrated in FIG. 1 and described above as being a single network, in certain embodiments, network 108 may correspond to multiple networks. For example, in certain embodiments, time-series validation tool 102, devices 106, first database 110, and/or second database 118 may be connected to one another over an internal network (e.g., an internal network belonging to an organization), while time-series validation tool 102 and/or devices 106 may be connected to external server 120 over an external network (e.g., external server 120 may be located outside of an organization's internal network).

First database 110 corresponds to a data storage location within system 100. For example, first database 110 may be a database, a storage server, a cloud storage system, or any other suitable data storage location capable of storing a time-series 112, and, in certain embodiments, a golden copy data structure 116*a* associated with the time-series. While FIG. 1 illustrates, for simplicity, first database 110 storing a single time-series 112 and a single associated golden copy data structure 116*a*, this disclosure contemplates that first database 110 may store any number of time-series 112, and any number of associated golden copy data structures 116*a*.

As illustrated in FIG. 1, each time-series 112 includes multiple data sets 114*a* through 114*n*. Each data set 114 stores a set of information. This disclosure contemplates that each data set 114 may store information of any type and/or in format. For example, each data set 114 may store structured data, unstructured data, textual data, images, videos, audio, and/or any other suitable form of data.

Each data set 114 of time-series 112 may be associated with one or more labels that are used to distinguish the data set from the other data sets stored in time-series 112. As an example, a given data set 114*a* may be labelled with a time interval associated with the data set. The time interval associated with the data set 114 may correspond to a day, a week, a month, a year, and/or any other suitable time interval, and may indicate (1) when the information stored within the data set was created, (2) when the data set was added to time-series 112, and/or (3) any other suitable temporal information associated with the data set. As another example, a given data set 114a may be labelled with a department/group responsible for the data set. As an example, in certain embodiments, each data set 114 (1) may have been generated by a given department or group within an organization, (2) may store information generated by a given department/group within an organization, and/or (3) may be assigned to a given department/group within an organization that is responsible in some way for the information stored within the data set. As a specific example, time-series validation tool 102 may belong to a financial organization, and each data set 114 of time-series 112 may be associated with a given trading desk within the organization. Each department/group/desk within the organization may be responsible for regularly storing data in time-series 112. Such data may later be used for any suitable purpose. For instance, in certain embodiments, each department may be responsible for storing data in time-series 112 that may later be provided to an external organization (e.g., an external organization associated with external server 120). More specifically, in certain embodiments, each department may be responsible for storing data in time-series 112 that may later be provided to a regulator, who may use the data to evaluate whether the organization to which time-series validation tool 102 belongs has properly complied with certain regulatory requirements imposed upon it.

In certain embodiments, users 104 of devices 106 belong to the organizational departments/groups that are responsible for storing data sets 114 in time-series 112. In such embodiments, users 104 may use devices 106 to submit new data sets 114 for storage in time-series 112. For example, in certain embodiments in which each data set 114 of time-series 112 is associated with a month, users 104 may submit new data sets 114 for storage in time-series 112 on a monthly basis. In certain embodiments, users 104 may modify data sets 114 previously stored in time-series 112. As an example, a user 104a may determine that an incorrect piece of information exists in a particular data set 114k (corresponding, for example, to information produced during May 2020). Accordingly, user 104 may manually post a backdated adjustment to data set 114k, to correct the identified error. In some embodiments, the information stored in later data sets may depend on the information stored in earlier data sets. For example, each of data sets 114l (corresponding, for example, to June 2020) through 114n (corresponding, for example, to August 2020) may depend on the information stored in data set 114k (corresponding, to May 2020). Accordingly, user 104 may also need to post backdated adjustments to each of these data sets 114l through 114n, to account for the error identified in data set 114k.

In certain embodiments, once a data set 114 is added to time-series 112, one or more protections may be implemented, to prevent unintended changes from being made to the data set. For example, once data set 114 is added to time-series 112, the data set may be locked, write permissions may be removed from the data set, and/or any other suitable protection may be applied to the data set to prevent modifications from subsequently being made to it. In certain such embodiments, when an error is identified in time-series 112 for which backdated adjustments should be made, a system administrator may remove one or more of the protections from time-series 112, thereby enabling a user 104 to modify time-series 112 to correct for the identified error. In such embodiments, any changes to a given data set 114, after the data set has been stored in time-series 112, may either be intended changes, associated with the application of backdated adjustments to time-series 112 to correct for errors identified in time-series 112, or unintended changes. Such unintended changes may include, for example, inadvertent errors introduced while attempting to correct known errors (e.g., errors introduced while attempting to post backdated adjustments to time-series 112), errors associated with memory/storage corruption issues, errors associated with malware infections, and/or errors arising in any other unintentional manner.

First database 110 may also store a copy of the golden copy data structure—golden copy 116a. As described above, golden copy 116a provides a compressed representation of time-series 112 as it existed in first database 110 at a given time when the validity of each data set 114 was presumed to be known (e.g., when time-series 112 was first stored in database 110, and/or immediately after time-series 112 passed a validation check). In certain embodiments, golden copy 116a is a Merkle tree data structure generated from time-series 112, as described in further detail below, in the discussion of FIGS. 2A and 2B.

In certain embodiments, system 100 includes a second database 118. Second database 118 is an additional data storage location, separate from first database 110, in which a second copy of the golden copy data structure—golden copy 116b—is stored. By storing golden copy 116b in a separate data storage location from time-series 112, certain embodiments of time-series validation system 100 help to ensure that memory/storage corruption issues do not simultaneously impact both time-series 112 and the golden copy data structure 116 used to determine the validity of the time-series.

External server 120 is an external computer system to which time-series 112 may be transmitted. This disclosure contemplates that time-series 112 may be transmitted to external server 120 for any suitable purpose. For example, in certain embodiments, time-series validation tool 102 may belong to an organization that is subject to certain regulations imposed by one or more regulatory agencies. The organization may be required to store specific information in time-series 112, which the regulatory agencies may use to ensure that the organization is in compliance with the associated regulations. In such embodiments, external server 120 may correspond to a computer system belonging to one of the regulatory agencies. In certain embodiments, time-series validation tool 102 may be configured to transmit time-series 112 to external server 120 at regular intervals. In some embodiments, one or more devices 106 may transmit requests 132 to time-series validation tool 120, instructing time-series validation tool 102 to transmit time-series 112 to external server 120.

In certain embodiments, external server 120 may store a copy of the golden copy data structure—golden copy 116c. For example, prior to and/or in conjunction with transmitting time-series 112 to external server 120, time-series validation tool 102 may transmit golden copy 116c to external server 120. External server 120 may use the received golden copy data structure 116c to confirm that the copy of time-series 112 it receives was not corrupted during transmission to external server 120. For example, as described below, in the discussion of FIG. 2B, in response to receiving time-series 112, external server 120 may use the received time-series to generate a current version of the time-series data structure, which it may compare with golden copy 116c. If the current version of the time-series data structure matches golden copy 116c, external server 120 (or an administrator operating external server 120) may be confident that time-series 112 was not corrupted during transmission to external server 120. As illustrated in FIG. 1, time-series validation tool 102 includes a processor 122 and a memory 124. This disclosure contemplates processor 122 and memory 124 being configured to perform any of the functions of time-series validation tool 102 described herein. Generally, time-series validation tool 102 is configured to: (1) generate, at a first time, a first version of a compressed representation of a time-series that is stored in database 110; (2) store the first version of the compressed representation as a golden copy data structure 116 in one or more locations within system 100; (3) determine that time-series 112 should be transmitted to external server 120 (e.g., by receiving a request 134 to transmit time-series 112 to external server 120); (4) generate a new version of the compressed representation of time-series 112, based on the time-series as it currently exists in database 110; (5) compare the new version of the compressed representation of the time-series to the golden copy data structure 116; (6) in response to determining that the new version of the compressed representation of the time-series matches the golden copy data structure 116, transmit time-series 112 to external server 120; and (7) in response to determining that the new version of the compressed representation of the time-series does not match the golden copy data structure 116, (a) identify one or more data sets 114 within time-series 112 that have changed since golden copy data structure 116 was generated, and (b) transmit requests 132 for manual validation of the changed data sets.

Processor 122 is any electronic circuitry, including, but not limited to central processing units (CPUs), graphics processing units (GPUs), microprocessors, application specific integrated circuits (ASIC), application specific instruction set processor (ASIP), and/or state machines, that communicatively couples to memory 124 and controls the operation of time-series validation tool 102. Processor 122 may be 8-bit, 16-bit, 32-bit, 64-bit or of any other suitable architecture. Processor 122 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 122 may include other hardware and software that operates to control and process information. Processor 122 executes software stored on memory 124 to perform any of the functions described herein. Processor 122 controls the operation and administration of time-series validation tool 102 by processing information received from device(s) 106, first database 110, second database 118, external server 120, and/or memory 124. Processor 122 may be a programmable logic device, a microcontroller, a microprocessor, any suitable processing device, or any suitable combination of the preceding. Processor 122 is not limited to a single processing device and may encompass multiple processing devices.

Memory 124 may store, either permanently or temporarily, data, operational software, or other information for processor 122. Memory 124 may include any one or a combination of volatile or non-volatile local or remote devices suitable for storing information. For example, memory 124 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 124, a disk, a CD, or a flash drive. In particular embodiments, the software may include an application executable by processor 122 to perform one or more of the functions described herein.

In certain embodiments, memory 124 stores instructions 126 for generating a time-series data structure (e.g., golden copy data structure 116) from time-series 112, and/or instructions 128 for using golden copy data structure 116 to validate time-series 112 as it currently exists in first database 110. The behavior of time-series validation tool 102 in response to executing instructions 126 is described in detail below, in the discussion of FIGS. 2A and 3. Similarly, the behavior of time-series validation tool 102 in response to executing instructions 128 is described in detail below, in the discussion of FIGS. 2B and 4.

Modifications, additions, or omissions may be made to the systems described herein without departing from the scope of the invention. For example, system 100 may include any number of users 104, devices 106, networks 108, first databases 110, time-series 112, golden copy data structures 116, second databases 118, external servers 120, processors 122, memories 124, data structure creation instructions 126, and/or time-series validation instructions 128. The components may be integrated or separated. Moreover, the operations may be performed by more, fewer, or other components. Additionally, the operations may be performed using any suitable logic comprising software, hardware, and/or other logic.

II. Merkle Tree Time-Series Data Structure

Figure 2A:
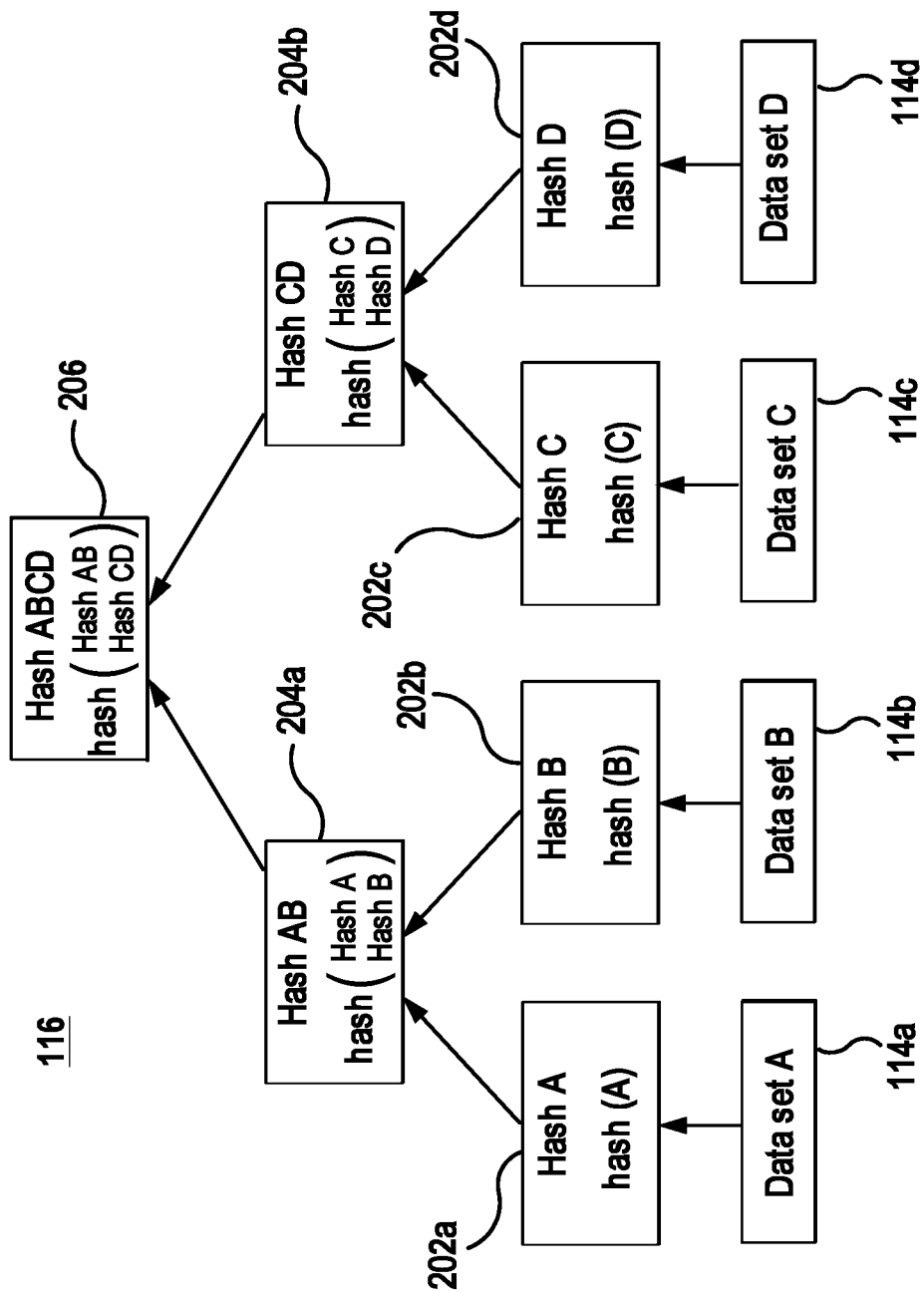
FIGS. 2A through 2C illustrate example Merkle tree data structures generated by the time-series validation tool of the system of FIG. 1, based on a given time-series as it exists at different times in the system.
Figure 2B:
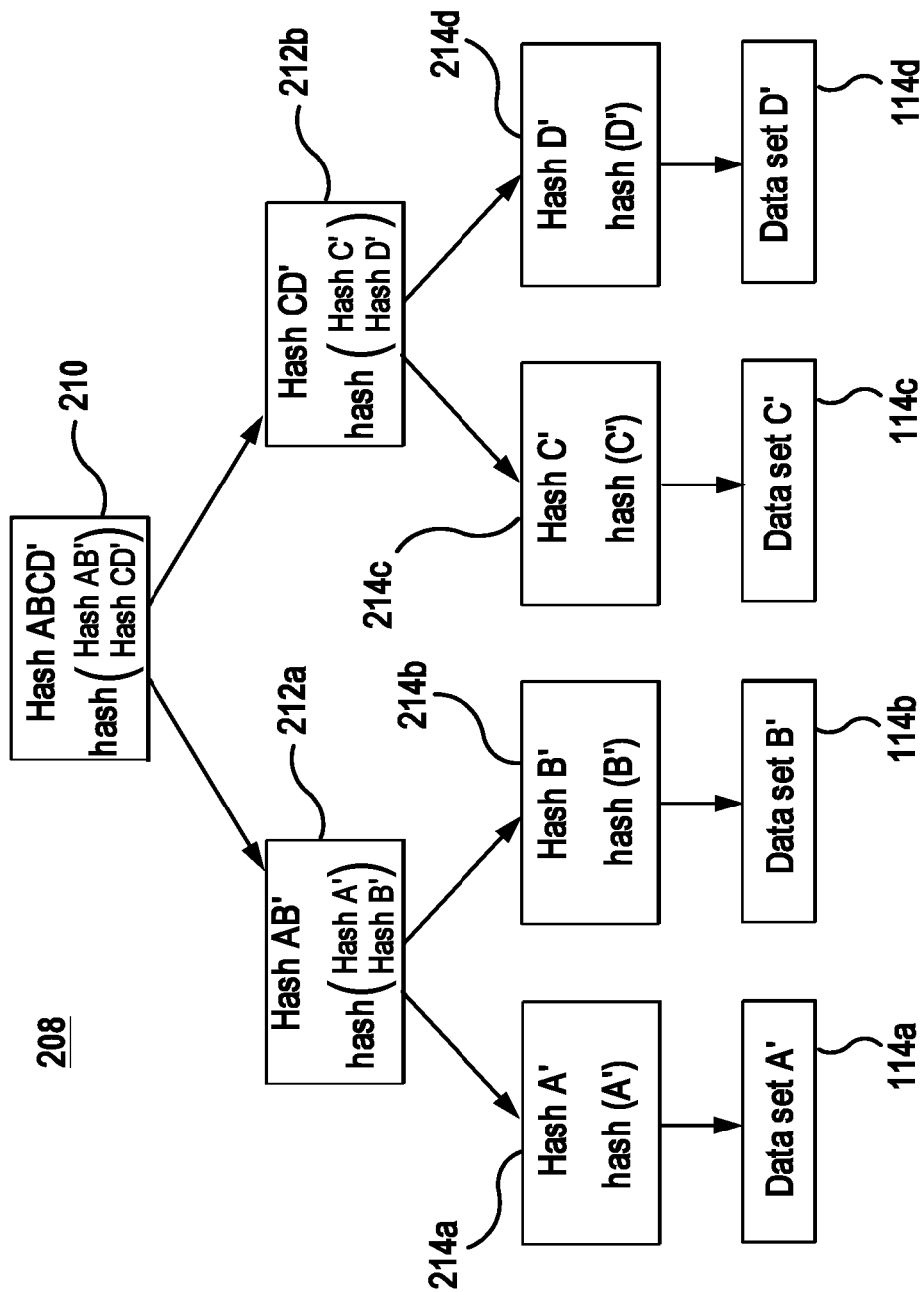

FIGS. 2A and 2B illustrate two versions of an example Merkle tree data structure generated from a time-series 112 that is composed of first data set 114a, second data set 114b, third data set 114c, and fourth data set 114d. FIG. 2A illustrates the golden copy data structure 116 for time-series 112, generated when time-series 112 was first stored in database 110, while FIG. 2B illustrates a later version 208 of the data structure, generated based on the time-series as it existed in database 110 at a later time. While FIGS. 2A and 2B illustrate, for simplicity, a time-series that includes four data sets 114a through 114d, this disclosure contemplates that time-series 112 may include any number of data sets 114.

As illustrated in FIG. 2A, golden copy data structure 116 includes a set of nodes, arranged into a set of levels. For example, golden copy data structure 116 includes a bottom level of nodes 202a through 202d, and a set of subsequent levels of nodes, including a middle level of nodes 204a and 204b, and a top level consisting of terminal node 206. Each node 202a through 202d of the bottom level is assigned to a data set 114 of the time-series 112. For example, first node 202a is assigned to first data set 114a, second node 202b is assigned to second data set 114b, third node 202c is assigned to third data set 114c, and fourth node 202d is assigned to fourth data set 114d. Each node 202a through 202d of the bottom level of nodes stores a hash value of the data set 114 assigned to the node. For example, first node 202a stores a hash value generated from first data set 114a, second node 202b stores a hash value generated from second data set 114b, third node 202c stores a hash value generated from third data set 114c, and fourth node 202d stores a hash value generated from fourth data set 114d. Time-series validation tool 102 may use any suitable hash function to generate the hash values stored by bottom nodes 202a through 202d. For example, in certain embodiments, a cryptographic hash function such as MD5, SHA-1, SHA-2, SHA-3, RIPEMD- 160, Whirlpool, BLAKE2, BLAKE3, and/or any other suitable cryptographic hash function may be used to generate a hash value from each data set 114.

As illustrated in FIG. 2A, each subsequent level in the data structure 116 includes fewer nodes than the previous level. For example, the middle level of nodes 204a and 204b includes half as many nodes as bottom level of nodes 202a through 202d, and the top level, consisting of terminal node 206, includes half as many nodes as the middle level of nodes 204a and 204b. In particular, each node of each subsequent level in data structure 116 is assigned to a subset of nodes of the immediately prior level, and stores a hash value generated from the hash values stored by those assigned nodes. For example, middle level node 204a is assigned to a subset of nodes of the bottom level that includes bottom level nodes 202a and 202b, and stores a hash value generated from the hash values stored by nodes 202a and 202b, while middle level node 204b is assigned to a subset of nodes of the bottom level that includes bottom level nodes 202c and 202d, and stores a hash value generated from the hash values stored by nodes 202c and 202d. Similarly, top level terminal node 206 is assigned to middle level nodes 204a and 204b, and stores a hash value generated from the hash values stored by nodes 204a and 204b. While FIG. 2A illustrates an example of a binary Merkle tree, in which each node of each subsequent level is assigned to a pair of nodes of the immediately prior level, this disclosure contemplates that each node of each subsequent level may be assigned to a subset of nodes of the immediately prior level that includes any number of nodes.

The hash value stored by terminal node 206 corresponds to a compressed representation of the entire time-series 112. Accordingly, the value stored by terminal node 206 may be used to determine if any changes have been made to time-series 112. In particular, time-series validation tool 102 may generate a new version of the Merkle tree data structure based on the time-series 112 as it exists in database 110 at a later time, after golden copy 116 was generated, and compare the value stored in the terminal node of the new version of the data structure, with the value stored in the terminal node of golden copy 116. FIG. 2B is used to describe this process.

FIG. 2B illustrates a new version 208 of the Merkle tree data structure, generated based on time-series 112 as it existed in database 110 at a time when the validity of the time-series is unknown (e.g., at a time after golden copy data structure 116 was generated). Time-series validation tool 102 generates the new version 208 of the Merkle tree data structure using the same instructions 126 as used to generate golden copy 116. Accordingly, the new version 208 of the Merkle tree data structure has the same form as golden copy 116. In particular, each node of new version 208 of the Merkle tree data structure corresponds to a node of golden copy 116. For example, new version 208 of the Merkle tree data structure includes (1) a bottom level of nodes 214a through 214d, corresponding to bottom level of nodes 202a through 202d of golden copy data structure 116, and (2) a set of subsequent levels of nodes, including (i) a middle level of nodes 212a and 212b, corresponding to middle level of nodes 204a and 204b of golden copy 116, and (ii) a top level consisting of terminal node 210, which corresponds to terminal node 206 of golden copy 116.

Time-series validation tool 102 is configured to generate new version 208 of the Merkle tree data structure for use in validating time-series 112, prior to transmitting time-series 112 to an external server 120, or in response to receiving a request 134 for validation. After generating new version 208 of the Merkle tree data structure, time-series validation tool 102 compares new version 208 with golden copy 116, to determine whether any of the data sets 114a through 114d have changed since golden copy 116 was generated. In particular, time-series validation tool 102 first compares terminal node 206 of golden copy 116 with terminal node 210 of new version 208. Because the terminal node of the Merkle tree data structure depends on the values of all of the previous nodes in the tree, any changes introduced into time-series 112 will be reflected in the value of the terminal node. Therefore, time-series validation tool 102 may determine whether any changes have been made to time-series 112 since the golden copy 116 of the Merkle tree data structure was generated, simply by comparing the value stored by terminal node 206 of golden copy 116 with the value stored by terminal node 210 of the new version 208 of the Merkle tree data structure. If the values stored by terminal nodes 206 and 210 match, no changes have been made to time-series 112. Thus, by comparing a single value (the value stored by terminal nodes 206 and 210), time-series validation tool 102 is able to validate the information stored by time-series 112.

On the other hand, if the values stored by terminal nodes 206 and 210 do not match, then one or more changes have been made to time-series 112. Time-series validation tool 102 may further identify those data sets 114 of time-series 112 in which the changes have been introduced, by traversing the Merkle tree data structure. In particular, in response to determining that the value stored by a given node of the golden copy 116 of the Merkle tree data structure does not match the value stored by the corresponding node of the new version 208 of the Merkle tree data structure, time-series validation tool 102 next compares the values stored by the nodes of the immediately prior level that are assigned to the non-matching node. For instance, in response to determining that the value stored by terminal node 206 does not match the value stored by terminal node 210, time-series validation tool 102 next compares (1) the value stored by node 204a of golden copy 116 with the value stored by corresponding node 212a of new version 208, and (2) the value stored by node 204b of golden copy 116 with the value stored by corresponding node 212b of new version 208. This process continues until time-series validation tool 102 has identified one or more nodes of the bottom level of the Merkle tree data structures 116 and 208 that store values that do not match one another. As an example, in response to determining that the value stored by node 204a matches the value stored by corresponding node 212a, and that the value stored by node 204b does not match the value stored by corresponding node 212b, time-series validation tool 102 next compares (1) the value stored by bottom level node 202c with the value stored by corresponding bottom level node 214c, and (2) the value stored by bottom level node 202d with the value stored by corresponding bottom level node 214d, to determine which of data sets 114c and 114d have changed since golden copy 116 of the Merkle tree data structure was generated.

Figure 2C:
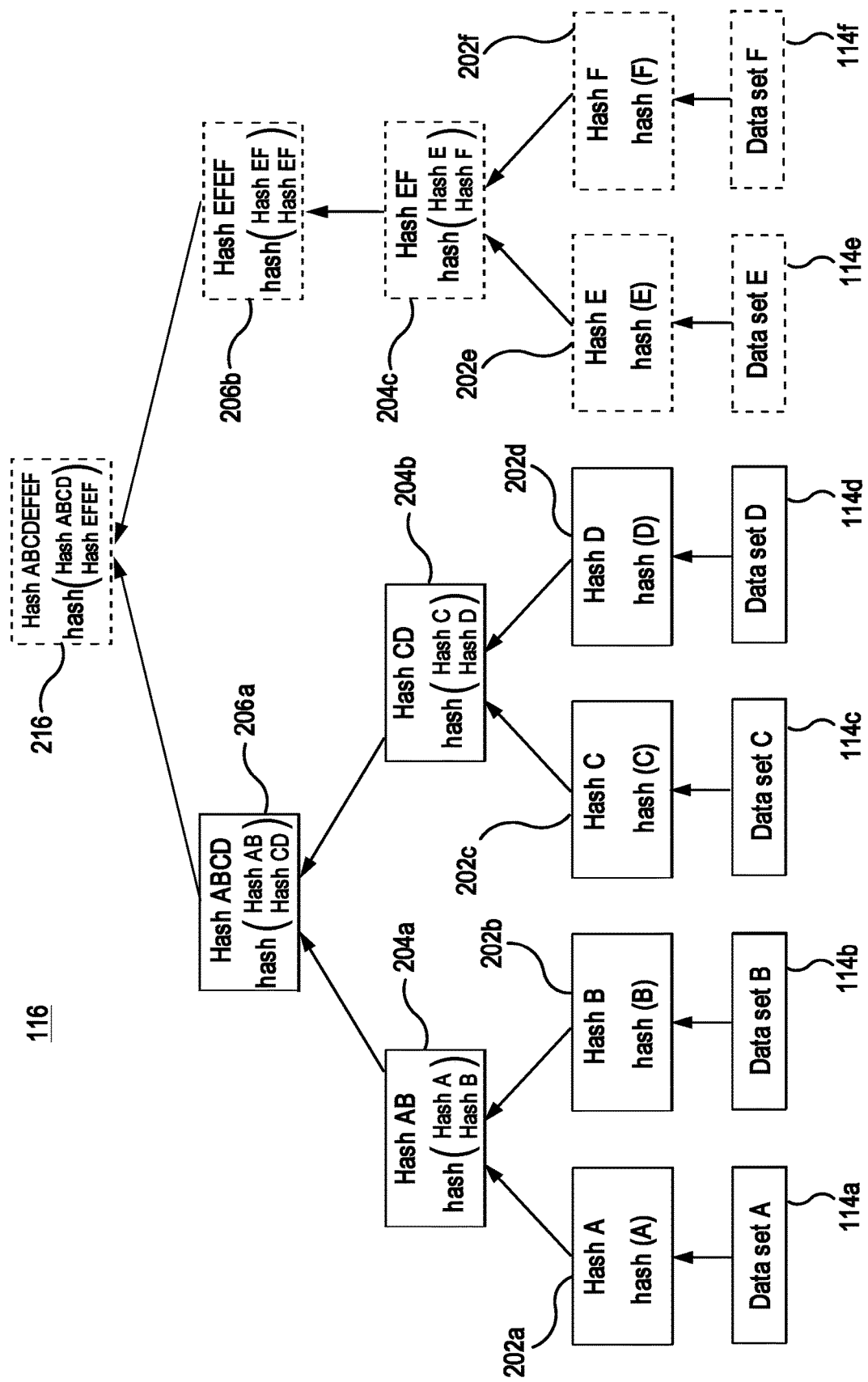

Golden copy data structure 116 may be generated from time-series 112 once time-series 112 is complete (e.g., after all of the data sets 114 that form the time-series 112 have been added), or while new data sets 114 are still being added to time-series 112. FIG. 2C illustrates an example in which a pair of data sets—data set 114e and data set 114f—have been added to time-series 112, and time-series validation tool 102 correspondingly updates golden copy data structure 116 to reflect these additions.

FIG. 2C presents an example in which golden copy data structure 116 initially corresponds to a time-series 112 that includes four data sets—first data set 114a, second data set 114b, third data set 114c, and fourth data set 114d. Each of these data sets may be associated with a particular time interval and a particular department within an organization. For example, first data set 114a and second data set 114b may both correspond to data generated during the month of May 2021, with first data set 114a having been generated by a first department, and second data set 114b generated by a second department. Similarly, third data set 114c and fourth data set 114d may both correspond to data generated during the month of June 2021, with third data set 114c having been generated by the first department, and fourth data set 114d generated by the second department. Each of the first department and the second department may continue generating data sets on a monthly basis. For example, first department and second department may next generate data sets 114e and 114f, respectively, each corresponding to data generated during the month of July 2021. These new data sets 114e and 114f may be stored in time-series 112 in any suitable manner. For example, in certain embodiments, a user 104a belonging to the first department uses device 106a to store data set 114e directly in time-series 112 in database 110, and a user 104b belonging to the second department similarly uses device 106b to store data set 114f directly in time-series 112 in database 110. As another example, in certain embodiments, a user 104a belonging to the first department uses device 106a to transmit data set 114e to time-series validation tool 102, and the tool then stores the data set in time-series 112 in database 110. Similarly, a user 104b belonging to the second department may use device 106b to transmit data set 114f to time-series validation tool 102, and the tool then stores the data set in time-series 112 in database 110.

In response to a new data set 114 being added to time-series 112, time-series validation tool 102 may be configured to modify golden copy data structure 116 to include information associated with the new data set. As an example, where users 104 add new data sets 114 directly to time-series 112, time-series validation tool 102 may be configured to monitor time-series 112 for the addition of any new data sets 114, and to modify golden copy data structure 116 in response to detecting the addition of one or more new data sets 114. As another example, where users 104 submit new data sets 114 to time-series validation tool 102, the tool may be configured to modify golden copy data structure 116 in conjunction with storing the new data sets in time-series 112.

Time-series validation tool 102 may modify golden copy data structure 116 in response to the addition of a single new data set 114 to time-series 112, or in response to the addition of multiple new data sets 114 to time-series 112. FIG. 2C presents an example in which time-series validation tool 102 modifies golden copy data structure 116 in response to the addition of data sets 114e and 114f to time-series 112. As illustrated in FIG. 2C, time-series validation tool 102 generates a new bottom level node from each new data set 114. In particular, time-series validation tool 102 generates bottom level node 202e, corresponding to data set 114e and storing a hash value generated from data set 114e, and bottom level node 202f, corresponding to data set 114f and storing a hash value generated from data set 114f. Time-series validation tool 102 next generates an additional middle level node 204c, which is assigned to the new pair of bottom level nodes 114e and 114f, and stores a hash value generated from the hash values stored by each assigned bottom level node 114e and 114f. Time-series validation tool 102 then generates a new node 206b at the next subsequent level in golden copy data structure 116. As illustrated in FIG. 2C, because only a single new middle level node 204c exists, time-series validation tool 102 assigns only this single node to new node 206b (rather than a pair of nodes). Because new node 206b is only assigned a single node of the previous level, the hash value it stores is modified as compared to the hash values stored by the other nodes of the same level. For example, in certain embodiments, node 206b stores (1) the same hash value as stored by assigned node 204c, (2) a hash value generated by applying a hash function to the hash value stored by assigned node 204c, (3) a hash value generated by applying a hash function to the combination of the hash value stored by assigned node 204c with itself (as illustrated in FIG. 2C), and/or (4) any other suitable hash value. The addition of node 206b converts the previous top level of golden copy data structure 116 to an additional middle level of the data structure; because this level includes a pair of nodes—node 206a and node 206b—an additional level may be added to data structure 116, that includes a single node assigned to the pair of nodes 206a and 206b. Accordingly, time-series validation tool 102 generates a new top level terminal node 216, which is assigned to previous terminal node 206a and new node 206b, and which stores a hash value generated from the hash values of those nodes. Time-series validation tool 102 may update golden copy data structure 116 in this manner, or in any other suitable manner, to account for the addition of any number of new data sets 114.

III. Method for Generating the Golden Copy Data Structure

Figure 3:
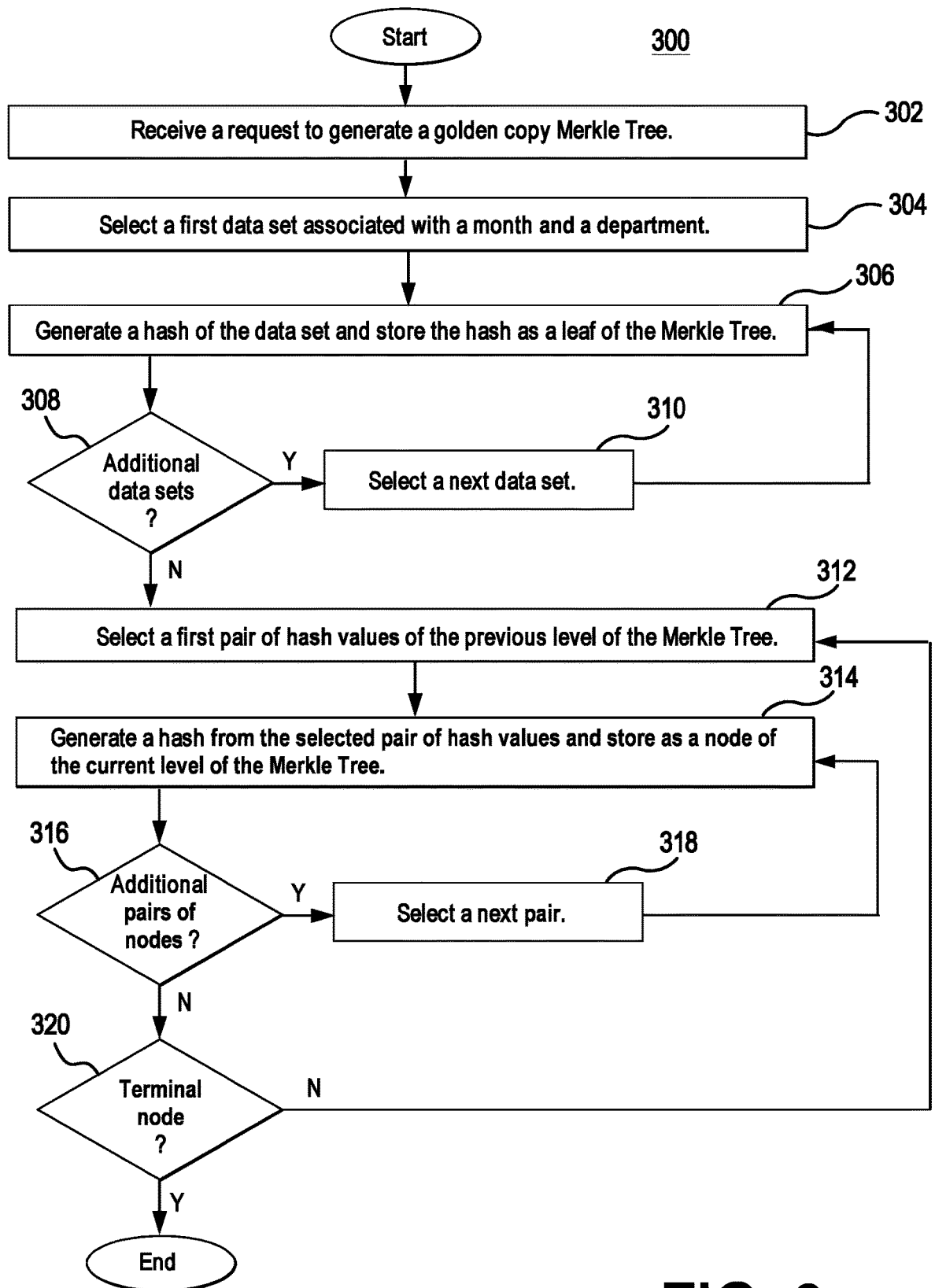
FIG. 3 presents a flowchart illustrating an example method by which the time-series validation tool of the system of FIG. 1 generates a Merkle tree data structure from a given time-series.

FIG. 3 presents a flowchart illustrating an example method 300 (described in conjunction with elements of FIGS. 1 and 2A) used by time-series validation tool 102 to generate a golden copy data structure 116 based on a time-series 112.

In step 302 time-series validation tool 102 receives a request 134 to generate a golden copy data structure 116 based on a time-series 112 that includes multiple data sets 114. In step 304 time-series validation tool 102 selects a first data set 114 from the time-series. The first data set 114 is associated with a given time interval (e.g., a month), and a given department within an organization. In step 306 time-series validation tool 102 generates a hash value from the data set and stores the hash value as a leaf of a Merkle tree data structure. The leaf of the Merkle tree data structure is labelled according to both the time interval associated with the data set and the department associated with the data set. In step 308 time-series validation tool 102 determines whether time-series 112 includes any additional data sets 114 that the tool has not yet considered. If, in step 308 time-series validation tool 102 determines that time-series 112 includes additional data sets 114 that the tool has not yet considered, in step 310 time-series validation tool 102 selects a next data set 114 from time-series 112. Method 300 then returns to step 306.

If, in step 308 time-series validation tool 102 determines that time-series 112 does not include any additional data sets 114 that the tool has not yet considered, in step 312 time-series validation tool 102 begins constructing the next level of golden copy data structure 116. In particular, time-series validation tool 102 selects a pair of nodes of the previous level. In step 314 time-series validation tool 102 generates a hash value from the hash values stored by the selected pair of nodes of the previous level, and stores this hash value as a node of the current level of golden copy data structure 116. In step 316 time-series validation tool 102 determines if the previous level of golden copy data structure 116 includes any additional pairs of nodes that the tool has not yet considered. If, in step 316 time-series validation tool 102 determines that the previous level of golden copy data structure 116 includes one or more additional pairs of nodes that the tool has not yet considered, in step 318 the tool selects one of those additional pairs of nodes of the previous level. Method 300 then returns to step 314.

If, in step 316 time-series validation tool 102 determines that the previous level of golden copy data structure 116 does not include any additional pairs of nodes that the tool has not yet considered, in step 320 time-series validation tool determines whether it has generated the terminal node of golden copy data structure 116. In particular, time-series validation tool 102 determines whether the current level of golden copy data structure 116 that the tool just finished creating includes only a single node (in which case the node corresponds to the terminal level node), or if the current level includes multiple nodes (in which case the current level is a middle level of golden copy data structure 116). If, in step 320 time-series validation tool 102 determines that it has not yet generated the terminal node of golden copy data structure 116, method 300 returns to step 314. On the other hand, if, in step 302 time-series validation tool 102 determines that it has generated the terminal node of golden copy data structure 116, method 300 ends.

Modifications, additions, or omissions may be made to method 300 depicted in FIG. 3. Method 300 may include more, fewer, or other steps. For example, steps may be performed in parallel or in any suitable order. While discussed as time-series validation tool 102 (or components thereof) performing certain steps, any suitable components of system 100, including, for example, devices 106, may perform one or more steps of the method.

IV. Method for Validating a Time-Series Using the Golden Copy Data
Structure

Figure 4:
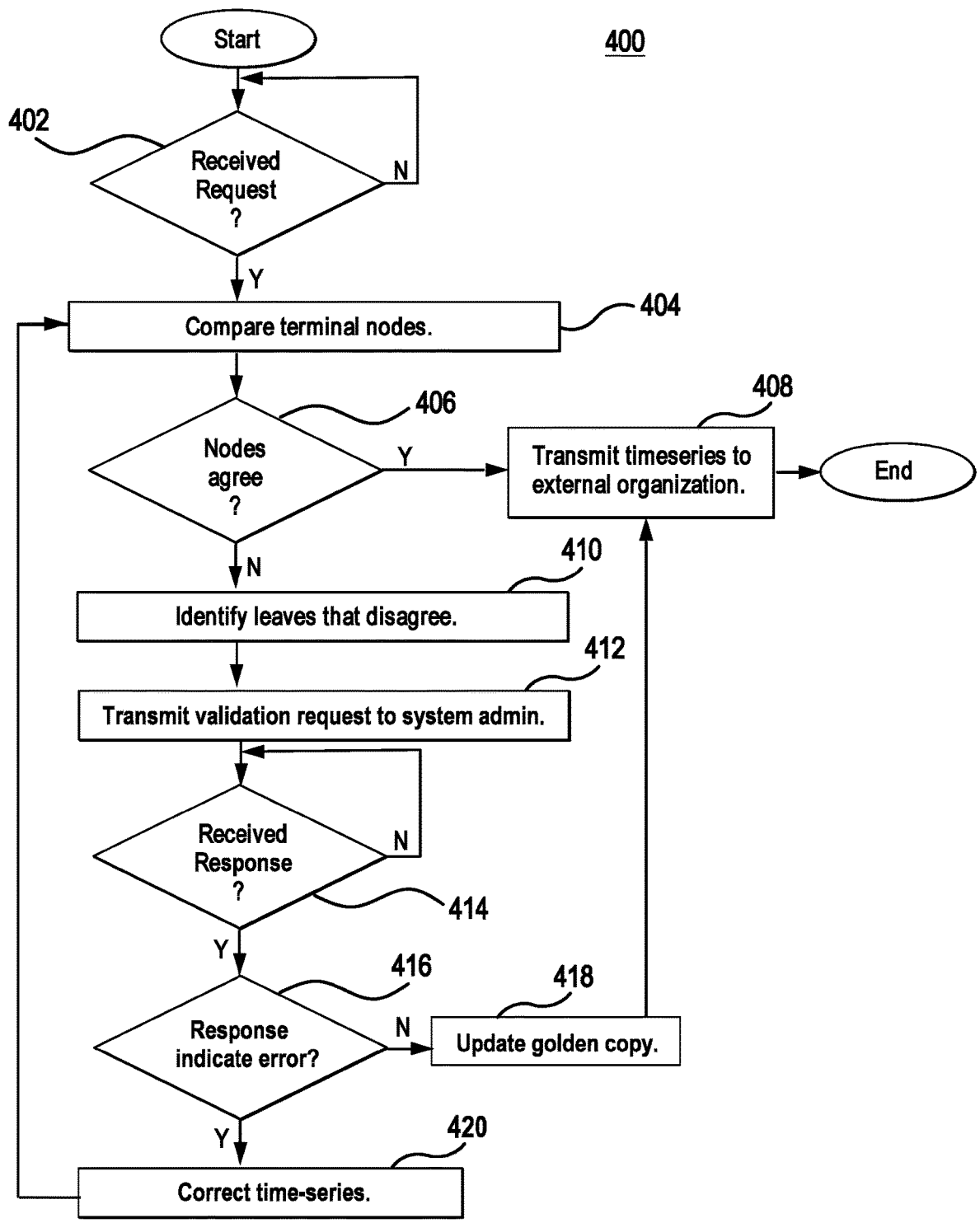
FIG. 4 presents a flowchart illustrating an example method by which the time-series validation tool of the system of FIG. 1 uses a pair of Merkle tree data structures generated, for example, by the method presented in FIG. 3, to validate a given time-series.

FIG. 4 presents a flowchart illustrating an example method 400 (described in conjunction with elements of FIGS. 1, 2A, and 2B) used by time-series validation tool 102 to validate the contents of a time-series 112, using a golden copy data structure 116 that was generated from that time-series 112 at a prior time at which the data sets 114 of time-series 112 were presumed to be valid.

In step 402 time-series validation tool 102 determines whether it has received a request to validate time-series 112 (e.g., to determine whether time-series 112 as it currently exists in database 110 includes changes as compared to the version of time-series 112 that was used to generate golden copy 116). As an example, time-series validation tool 102 may determine whether it has received a request 134 from a user device 106 to validate time-series 112. As another example, in certain embodiments, time-series validation tool 102 may determine whether it has received a request 134 from a user device 106 to transmit time-series 112 to an external server 120. In such embodiments, time-series validation tool 102 may be configured to validate time-series 112 prior to transmitting the time-series to external server 120.

If, in step 402 time-series validation tool 102 determines that it has received a request to validate time-series 112 and/or transmit time-series 112 to an external server 102, in step 404 time-series validation tool 102 generates a new version 208 of the time-series data structure, based on time-series 112 as it currently exists in database 110, and compares terminal node 210 of new version 208 with terminal node 206 of golden copy 116. For example, time-series validation tool 102 may execute method 300 illustrated in FIG. 3 to generate a new version 208 of the time-series data structure. In step 406 time-series validation tool 102 determines whether the value stored by terminal node 210 of new version 208 matches the value stored by terminal node 206 of golden copy 116. If, in step 406 time-series validation tool 102 determines that the value stored by terminal node 210 of new version 208 matches the value stored by terminal node 206 of golden copy 116, in step 408 time-series validation tool 102 transmits time-series 112 to external server 120, and/or transmits a response 132 to user device 106 indicating that time-series 112 has been validated.

On the other hand, if, in step 406 time-series validation tool 102 determines that the value stored by terminal node 210 of new version 208 does not match the value stored by terminal node 206 of golden copy 116, in step 410 time-series validation tool 102 traverses the nodes of new version 208 and golden copy 116 to identify the bottom level nodes of new version 208 that do not match the corresponding bottom level nodes of golden copy 116, as described in detail above, in the discussion of FIG. 2B. Each of these bottom level nodes is assigned to a data set 114 of time-series 112, and stores a hash value generated from the assigned data set. Accordingly, identifying one or more bottom level nodes of new version 208 that do not match the corresponding bottom level nodes of golden copy 116 is equivalent to determining that the data sets 114 that are assigned to those bottom level nodes have changed in some way (e.g., the values of one or more pieces of information stored within the data sets have changed) since the data sets were used to generate golden copy data structure 116. After identifying one or more bottom level nodes (each of which is assigned to a data set 114 of time-series 112) of new version 208 that do not match the corresponding bottom level nodes of golden copy 116, time-series validation tool 102 identifies the month and/or department associated with the data set(s) 114 assigned to those nodes. Next, in step 412 time-series validation tool 102 transmits one or more validation requests 132 to user(s) 104 belonging to the identified department(s), requesting manual validation of the identified data set(s). As a specific example, consider a situation in which bottom level node 214a of new version 208 does not match corresponding bottom level node 202a of golden copy 116. Time-series validation tool 102 may determine that data set 114a, which is assigned to bottom level nodes 202a and 214a, was generated by a first department and is associated with the month of May 2021. Accordingly, time-series validation tool 102 may generate a request 132 to be transmitted to a user 104a belonging to the first department, which identifies data set 114a by its associated month—May 2021—and indicates that manual validation should be performed on data set 114a. In response to receiving request 132, user 104a may review data set 114a to determine whether the change(s) made to the data set in the intervening time since the data set was used to generate golden copy data structure 116 were intentional changes, or unintentional changes. User 104a may then transmit a response 134 to time-series validation tool 102 indicating either that the changes made to data set 114a were (1) intentional changes (e.g., changes associated with a backdated adjustment), (2) unintentional changes that have since been corrected, and/or (3) unintentional changes that have not yet been corrected.

In step 416 time-series validation tool 102 determines whether it has received response(s) 134 to request(s) 132. If, in step 416 time-series validation tool 102 determines that it has received response(s) 134 to request(s) 132, in step 416 the tool determines whether the response indicates that the changes made to data set(s) 114 were intentional or unintentional changes. If, in step 416 time-series validation tool 102 determines that the response(s) received from user(s) 104 indicate that the changes made to the identified data set(s) 114 were intentional changes, in step 418 time-series validation tool 102 updates golden copy data structure 116 to reflect these intentional changes. Then, method 400 proceeds to step 408, where time-series validation tool 102 may transmit the validated time-series 112 to external server 120.

On the other hand, if, in step 416 time-series validation tool 102 determines that the response(s) received from user(s) 104 indicate that the changes made to the identified data set(s) 114 were unintentional changes, method 400 proceeds to step 420. In certain embodiments, in step 420 time-series validation tool 102 remediates the errors identified in time-series 112. For example, in certain embodiments, database 110 includes a version control system that records the changes made to time-series 112. In such embodiments, time-series validation tool 102 may instruct the version control system to revert to the version of time-series 112 that was in existence when golden copy data structure 116 was generated. As another example, in certain embodiments, system 100 stores a copy of time-series 112 as it existed in database 110 when golden copy data structure 116 was generated. In such embodiments, time-series validation tool 102 may replace the data set(s) 114 identified as including errors with the version(s) of those data set(s) stored in the copy of the time-series. As a further example, in certain embodiments, time-series validation tool 102 receives corrected version(s) of the identified data set(s) from user 104. Method 400 then returns to step 404, where time-series validation tool 102 proceeds to confirm that the errors identified in time-series 112 have been appropriately corrected.

Modifications, additions, or omissions may be made to method 500 depicted in FIG. 5. Method 500 may include more, fewer, or other steps. For example, steps may be performed in parallel or in any suitable order. As another example, in certain embodiments, time-series validation tool 102 does not monitor for requests to validate time-series 112 and/or to transmit time-series 112 to an external server 120, as depicted in step 402. Rather, in certain embodiments, time-series validation tool 102 may be configured to validate time-series 112 and/or transmit time-series 112 to an external server 120 at regular and/or pre-programmed time intervals.

As another example, in certain embodiments, steps 412 through 418 may be omitted from method 400. In particular, in certain embodiments, time-series validation tool 102 may automatically determine that one or more data sets 114 of time-series 112 include errors, without requesting that a user 104 perform manual validation on the data sets. As an example, in certain embodiments in which data sets 114 are associated with time intervals, the information stored in a given data set (e.g., 114d) may depend on the information stored in earlier data sets (e.g., data sets 114a through 114c). In such embodiments, in response to identifying one or more bottom level nodes of new version 208 that do not agree with the corresponding bottom level nodes of golden copy 116, time-series validation tool 102 is further configured to determine if the identified disagreements are consistent with an intentional backdated adjustment having been posted to time-series 112. In particular, for each data set 114 (e.g., data set 114b) that time-series validation tool 102 has identified as including one or more changes since the data set was used to generate golden copy data structure 116, time-series validation tool 102 determines whether the data sets 114 that depend on the identified data set (e.g., data sets 114c and 114d, each associated with time intervals later than that associated with data set 114b) also include changes. Specifically, if a backdated adjustment were correctly posted to data set 114b, the tool assumes that this adjustment would also lead to changes posted in data sets 114c, and 114d, which depend on data set 114b. If time-series validation tool 102 determines that one or both of data sets 114c and 114d have not changed since golden copy data structure 116 was generated, the tool assumes that one or more errors have been introduced into time-series 112. For example, data set 114b may have changed as a result of a memory/storage corruption issue, and/or a backdated adjustment to time-series 112 may not have been properly posted. In response to identifying one or more inconsistent changes having been made to the data sets 114 of time-series 112, method 400 may proceed directly to step 420, where corrections are applied to time-series 112. In certain embodiments, a message 132 may additionally or alternatively be sent to one or more users 104, identifying the data sets 114 associated with the inconsistent changes.

While discussed as time-series validation tool 102 (or components thereof) performing certain steps, any suitable components of system 100, including, for example, devices 106, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:
1. An apparatus comprising:
a memory configured to store:
a time-series comprising a plurality of data sets;
a first version of a data structure, generated based on the time-series as the time-series existed in the memory at a first time, the data structure comprising:
a sequence of levels comprising a bottom level, and a plurality of subsequent levels, the plurality of subsequent levels comprising a top level, wherein:
each level of the sequence of levels comprises one or more groups of nodes, each group of nodes of the level comprising one or more nodes, each node of the one or more nodes storing data;
each data set of the time-series is assigned to a node of the bottom level, wherein the data stored by the assigned node comprises a compressed representation of the data set;
each subsequent level of the plurality of subsequent levels is assigned to a previous level of the sequence of levels, wherein each node of the subsequent level is assigned to a group of nodes of the previous level, and the data stored by the node was generated using the assigned group of nodes of the previous level; and
the top level comprises a terminal node, wherein the terminal node comprises a single hash value that represents each data set of the time-series; and
a hardware processor communicatively coupled to the memory, the hardware processor configured to:
receive a first request to validate the time-series; and
in response to receiving the first request:

generate a second version of the data structure based on the time-series as the time-series exists in the memory at a second time later than the first time;

determine that the data stored by the terminal node in the first version of the data structure does not match the data stored by the terminal node in the second version of the data structure; and in response to determining that the data stored by the terminal node in the first version of the data structure does not match the data stored by the terminal node in the second version of the data structure, generate an alert indicating that the time-series has changed between the first time and the second time.

2. The apparatus of claim 1, wherein the memory comprises:
a first database, wherein the time-series is stored in the first database; and
a second database separate from the first database, wherein the first version of the data structure is stored in the second database.

3. The apparatus of claim 1, wherein the hardware processor is further configured to, prior to receiving the first request:
receive a second request to validate the time-series; and
in response to receiving the second request:
generate a third version of the data structure based on the data set as the data set exists in the memory at a third time earlier than the second time;
determine that the data stored by the terminal node in the third version of the data structure matches the data stored by the terminal node in the first version of the data structure; and
in response to determining that the data stored by the terminal node in the third version of the data structure matches the data stored by the terminal node in the first version of the data structure, generate a message indicating that the time-series has been validated.

4. The apparatus of claim 1, wherein:
the plurality of subsequent levels of the data structure comprises a penultimate subsequent level, wherein the one or more groups of nodes of the penultimate subsequent level comprises a single group comprising a first node and a second node; and
in response to determining that the data stored by the terminal node in the second version of the data structure does not match the data stored by the terminal node in the first version of the data structure, the hardware processor is further configured to:
determine whether the data stored by the first node of the penultimate subsequent level in the second version of the data structure matches the data stored by the first node of the penultimate subsequent level in the first version of the data structure; and
determine whether the data stored by the second node of the penultimate subsequent level in the second version of the data structure matches the data stored by the second node of the penultimate subsequent level in the first version of the data structure.

5. The apparatus of claim 4, wherein:
the plurality of subsequent levels of the data structure comprises an antepenultimate subsequent level, wherein the one or more groups of nodes of the antepenultimate subsequent level comprises:
a first group comprising a first node and a second node, the first group assigned to the first node of the penultimate subsequent level; and
a second group comprising a first node and a second node, the second group assigned to the second node of the penultimate subsequent level; and
in response to determining that the data stored by the first node of the penultimate subsequent level in the second version of the data structure does not match the data stored by the first node of the penultimate subsequent level in the first version of the data structure, the hardware processor is further configured to:
determine whether the data stored by the first node of the first group of the antepenultimate subsequent level in the second version of the data structure matches the data stored by the first node of the first group of the antepenultimate subsequent level in the first version of the data structure; and
determine whether the data stored by the second node of the first group of the antepenultimate subsequent level in the second version of the data structure matches the data stored by the second node of the first group of the antepenultimate subsequent level in the first version of the data structure.

6. The apparatus of claim 1, wherein:
each data set of the plurality of data sets of the time-series is associated with:
a department of one or more departments within an enterprise, wherein the data set was generated by the department; and
a month of a sequence of months, wherein the month indicates at least one of:
when the data set was generated; and
when information stored in the data set was created;
the data stored by each node of the bottom level further comprises:
an identification of the department associated with the data set assigned to the node of the bottom level; and
an identification of the month associated with the data set assigned to the node of the bottom level;
the plurality of subsequent levels comprises a first subsequent level, wherein the first subsequent level immediately follows the bottom level in the sequence of levels; and
in response to determining that the data stored by the terminal node in the second version of the data structure does not match the data stored by the terminal node in the first version of the data structure, the hardware processor is further configured to:
determine that the data stored by a given node of the penultimate level in the second version of the data structure does not match the data stored by the given node of the penultimate level in the first version of the data structure, wherein the given node is assigned to a first group of nodes of the bottom level of the data structure; and
in response to the determining that the data stored by the given node of the penultimate level in the second version of the data structure does not match the data stored by the given node of the penultimate level in the first version of the data structure:
determine that the data stored by a first node of the first group of nodes of the bottom level in the second version of the data structure does not match the data stored by the first node of the first group of nodes of the bottom level in the first version of the data structure, wherein:

a particular data set of the time-series is assigned to the first node of the first group of nodes of the bottom level of the data structure; and
the alert comprises:
the identification of the department associated with the particular data set; and
the identification of the month associated with the particular data set.

7. The apparatus of claim 1, wherein each node of the bottom level of the data structure stores a first hash value generated by applying a first hash function to the data set assigned to the node.

8. A method comprising:
generating a first version of a data structure based on a time-series as the time-series exists in a memory at a first time, wherein:
the time-series comprises a plurality of data sets; and
the data structure comprises a sequence of levels comprising a bottom level, and a plurality of subsequent levels, the plurality of subsequent levels comprising a top level, wherein:
each level of the sequence of levels comprises one or more groups of nodes, each group of nodes of the level comprising one or more nodes, each node of the one or more nodes storing data;
each data set of the time-series is assigned to a node of the bottom level, wherein the data stored by the assigned node comprises a compressed representation of the data set;
each subsequent level of the plurality of subsequent levels is assigned to a previous level of the sequence of levels, wherein each node of the subsequent level is assigned to a group of nodes of the previous level, and the data stored by the node was generated using the assigned group of nodes of the previous level; and
the top level comprises a terminal node, wherein the terminal node comprises a single has value that represents each data set of the time-series; and
receiving a first request to validate the time-series; and
in response to receiving the first request:
generating a second version of the data structure based on the time-series as the time-series exists in the memory at a second time later than the first time;
determining that the data stored by the terminal node in the first version of the data structure does not match the data stored by the terminal node in the second version of the data structure; and
in response to determining that the data stored by the terminal node in the first version of the data structure does not match the data stored by the terminal node in the second version of the data structure, generate an alert indicating that the time-series has changed between the first time and the second time.

9. The method of claim 8, wherein:
the memory comprises a first database; and
the first version of the data structure is stored in a second database separate from the first database.

10. The method of claim 8, further comprising, prior to receiving the first request:
receiving a second request to validate the time-series; and
in response to receiving the second request:
generating a third version of the data structure based on the data set as the data set exists in the memory at a third time earlier than the second time;
determining that the data stored by the terminal node in the third version of the data structure matches the data stored by the terminal node in the first version of the data structure; and
in response to determining that the data stored by the terminal node in the third version of the data structure matches the data stored by the terminal node in the first version of the data structure, generating a message indicating that the time-series has been validated.

11. The method of claim 8, wherein:
the plurality of subsequent levels of the data structure comprises a penultimate subsequent level, wherein the one or more groups of nodes of the penultimate subsequent level comprises a single group comprising a first node and a second node; and
in response to determining that the data stored by the terminal node in the second version of the data structure does not match the data stored by the terminal node in the first version of the data structure, the method further comprises:
determining whether the data stored by the first node of the penultimate subsequent level in the second version of the data structure matches the data stored by the first node of the penultimate subsequent level in the first version of the data structure; and
determining whether the data stored by the second node of the penultimate subsequent level in the second version of the data structure matches the data stored by the second node of the penultimate subsequent level in the first version of the data structure.

12. The method of claim 11, wherein:
the plurality of subsequent levels of the data structure comprises an antepenultimate subsequent level, wherein the one or more groups of nodes of the antepenultimate subsequent level comprises:
a first group comprising a first node and a second node, the first group assigned to the first node of the penultimate subsequent level; and
a second group comprising a first node and a second node, the second group assigned to the second node of the penultimate subsequent level; and
in response to determining that the data stored by the first node of the penultimate subsequent level in the second version of the data structure does not match the data stored by the first node of the penultimate subsequent level in the first version of the data structure, the method further comprises:
determining whether the data stored by the first node of the first group of the antepenultimate subsequent level in the second version of the data structure matches the data stored by the first node of the first group of the antepenultimate subsequent level in the first version of the data structure; and
determining whether the data stored by the second node of the first group of the antepenultimate subsequent level in the second version of the data structure matches the data stored by the second node of the first group of the antepenultimate subsequent level in the first version of the data structure.

13. The method of claim 8, wherein:
each data set of the plurality of data sets of the time-series is associated with:
a department of one or more departments within an enterprise, wherein the data set was generated by the department; and a month of a sequence of months, wherein the month indicates at least one of:
  when the data set was generated; and
  when information stored in the data set was created;
the data stored by each node of the bottom level further comprises:
  an identification of the department associated with the data set assigned to the node of the bottom level; and
  an identification of the month associated with the data set assigned to the node of the bottom level;
the plurality of subsequent levels comprises a first subsequent level, wherein the first subsequent level immediately follows the bottom level in the sequence of levels; and
in response to determining that the data stored by the terminal node in the second version of the data structure does not match the data stored by the terminal node in the first version of the data structure, the method further comprises:
  determining that the data stored by a given node of the penultimate level in the second version of the data structure does not match the data stored by the given node of the penultimate level in the first version of the data structure, wherein the given node is assigned to a first group of nodes of the bottom level of the data structure; and
  in response to the determining that the data stored by the given node of the penultimate level in the second version of the data structure does not match the data stored by the given node of the penultimate level in the first version of the data structure:
    determining that the data stored by a first node of the first group of nodes of the bottom level in the second version of the data structure does not match the data stored by the first node of the first group of nodes of the bottom level in the first version of the data structure, wherein:
      a particular data set of the time-series is assigned to the first node of the first group of nodes of the bottom level of the data structure; and
      the alert comprises:
        the identification of the department associated with the particular data set; and
        the identification of the month associated with the particular data set.

14. The method of claim 8, wherein each node of the bottom level of the data structure stores a first hash value generated by applying a first hash function to the data set assigned to the node.

15. A system comprising:
a first database configured to store a time-series comprising a plurality of data sets;
a second database configured to store a first version of a data structure, generated based on the time-series as the time-series existed in the first database at a first time, the data structure comprising:
  a sequence of levels comprising a bottom level, and a plurality of subsequent levels, the plurality of subsequent levels comprising a top level, wherein:
    each level of the sequence of levels comprises one or more groups of nodes, each group of nodes of the level comprising one or more nodes, each node of the one or more nodes storing data;
    each data set of the time-series is assigned to a node of the bottom level, wherein the data stored by the assigned node comprises a compressed representation of the data set;
    each subsequent level of the plurality of subsequent levels is assigned to a previous level of the sequence of levels, wherein each node of the subsequent level is assigned to a group of nodes of the previous level and the data stored by the node was generated using the assigned group of nodes of the previous level; and
    the top level comprises a terminal node, wherein the terminal node comprises a single has value that represents each data set of the time-series;
a device of an administrator; and
a hardware processor configured to:
  receive, from the device of the administrator, a first request to validate the time-series; and
  in response to receiving the first request:
    generate a second version of the data structure based on the time-series as the time-series exists in the first database at a second time later than the first time;
    determine that the data stored by the terminal node in the first version of the data structure does not match the data stored by the terminal node in the second version of the data structure; and
    in response to determining that the data stored by the terminal node in the first version of the data structure does not match the data stored by the terminal node in the second version of the data structure, transmit an alert indicating that the time-series has changed between the first time and the second time.

16. The system of claim 15, wherein the hardware processor is further configured to, prior to receiving the first request:
receive, from the device of the administrator, a second request to validate the time-series; and
in response to receiving the second request:
  generate a third version of the data structure based on the data set as the data set exists in the first database at a third time earlier than the second time;
  determine that the data stored by the terminal node in the third version of the data structure matches the data stored by the terminal node in the first version of the data structure; and
  in response to determining that the data stored by the terminal node in the third version of the data structure matches the data stored by the terminal node in the first version of the data structure, transmit a message to the device of the administrator, the message indicating that the time-series has been validated.

17. The system of claim 15, wherein:
the plurality of subsequent levels of the data structure comprises a penultimate subsequent level, wherein the one or more groups of nodes of the penultimate subsequent level comprises a single group comprising a first node and a second node; and
in response to determining that the data stored by the terminal node in the second version of the data structure does not match the data stored by the terminal node in the first version of the data structure, the hardware processor is further configured to:
  determine whether the data stored by the first node of the penultimate subsequent level in the second version of the data structure matches the data stored by the first node of the penultimate subsequent level in the first version of the data structure; and determine whether the data stored by the second node of the penultimate subsequent level in the second version of the data structure matches the data stored by the second node of the penultimate subsequent level in the first version of the data structure.

18. The system of claim 17, wherein:

the plurality of subsequent levels of the data structure comprises an antepenultimate subsequent level, wherein the one or more groups of nodes of the antepenultimate subsequent level comprises:
 a first group comprising a first node and a second node, the first group assigned to the first node of the penultimate subsequent level; and
 a second group comprising a first node and a second node, the second group assigned to the second node of the penultimate subsequent level; and in response to determining that the data stored by the first node of the penultimate subsequent level in the second version of the data structure does not match the data stored by the first node of the penultimate subsequent level in the first version of the data structure, the hardware processor is further configured to:
 determine whether the data stored by the first node of the first group of the antepenultimate subsequent level in the second version of the data structure matches the data stored by the first node of the first group of the antepenultimate subsequent level in the first version of the data structure; and
 determine whether the data stored by the second node of the first group of the antepenultimate subsequent level in the second version of the data structure matches the data stored by the second node of the first group of the antepenultimate subsequent level in the first version of the data structure.

19. The system of claim 15, wherein:

each data set of the plurality of data sets of the time-series is associated with:
 a department of one or more departments within an enterprise, wherein the data set was generated by the department; and
 a month of a sequence of months, wherein the month indicates at least one of:
  when the data set was generated; and
  when information stored in the data set was created;
the data stored by each node of the bottom level further comprises:
 an identification of the department associated with the data set assigned to the node of the bottom level; and
 an identification of the month associated with the data set assigned to the node of the bottom level;

the plurality of subsequent levels comprises a first subsequent level, wherein the first subsequent level immediately follows the bottom level in the sequence of levels; and in response to determining that the data stored by the terminal node in the second version of the data structure does not match the data stored by the terminal node in the first version of the data structure, the hardware processor is further configured to:
 determine that the data stored by a given node of the penultimate level in the second version of the data structure does not match the data stored by the given node of the penultimate level in the first version of the data structure, wherein the given node is assigned to a first group of nodes of the bottom level of the data structure; and
 in response to the determining that the data stored by the given node of the penultimate level in the second version of the data structure does not match the data stored by the given node of the penultimate level in the first version of the data structure:
  determine that the data stored by a first node of the first group of nodes of the bottom level in the second version of the data structure does not match the data stored by the first node of the first group of nodes of the bottom level in the first version of the data structure, wherein:
   a particular data set of the time-series is assigned to the first node of the first group of nodes of the bottom level of the data structure; and
   the alert comprises:
    the identification of the department associated with the particular data set; and
    the identification of the month associated with the particular data set.

20. The system of claim 15, wherein each node of the bottom level of the data structure stores a first hash value generated by applying a first hash function to the data set assigned to the node.

* * * * *